United States Patent [19]
Ioka et al.

[11] Patent Number: 5,892,520
[45] Date of Patent: Apr. 6, 1999

[54] PICTURE QUERY SYSTEM USING ABSTRACT EXEMPLARY MOTIONS OF A POINTING DEVICE

[75] Inventors: Mikihiro Ioka, Tokyo; Masato Kurokawa, Kawasaki, both of Japan

[73] Assignee: International Business Machines Corporation, Armonk, N.Y.

[21] Appl. No.: 904,912

[22] Filed: Jun. 26, 1992

[30] Foreign Application Priority Data

Aug. 29, 1991 [JP] Japan .................................... 3-242329

[51] Int. Cl.$^6$ .................................................. G06T 13/00
[52] U.S. Cl. .......................................................... 345/474
[58] Field of Search ................................. 395/152, 154, 395/920, 934; 345/122, 473–474; 348/699, 700

[56] References Cited

U.S. PATENT DOCUMENTS

| | | | |
|---|---|---|---|
| 4,580,782 | 4/1986 | Ochi | 345/473 X |
| 4,600,919 | 7/1986 | Stern | 345/473 |
| 4,797,836 | 1/1989 | Witek et al. | 345/473 |
| 4,952,051 | 8/1990 | Lovell et al. | 345/473 X |
| 5,067,015 | 11/1991 | Combridge et al. | 348/413 X |
| 5,083,201 | 1/1992 | Ohba | 345/473 X |
| 5,099,322 | 3/1992 | Gove | 348/700 |
| 5,103,305 | 4/1992 | Watanabe | 348/700 |
| 5,105,271 | 4/1992 | Niihara | 348/699 X |
| 5,107,541 | 4/1992 | Hilton | 382/123 |
| 5,121,191 | 6/1992 | Casserreau et al. | 348/443 |
| 5,189,402 | 2/1993 | Naimark et al. | 345/122 |
| 5,214,758 | 5/1993 | Ohba et al. | 345/473 |
| 5,237,648 | 8/1993 | Mills et al. | 345/474 X |
| 5,252,953 | 10/1993 | Sandrew et al. | 345/473 |
| 5,287,446 | 2/1994 | Williams et al. | 345/474 |
| 5,305,208 | 4/1994 | Doi et al. | 707/502 |
| 5,353,397 | 10/1994 | Yokoyama et al. | 707/502 |

OTHER PUBLICATIONS

Brotman et al, Motion Interpolation by Optimal Control, Computer Graphics, Aug. 1988, pp. 309 to 315.

Primary Examiner—Anton Fetting
Attorney, Agent, or Firm—Ronald L. Drumheller

[57] ABSTRACT

A user may input a motion as a query condition to a motion picture database to retrieve one or more motion picture segments (i.e., motion picture scenes) in which an object moves with a matching motion. A motion information database is built of motion vector sequences extracted from stored motion pictures. A motion is inputted as a query by moving a pointing device, such as a mouse, in a desired motion sequence, rather than as a query expressed in words or as a formula. The inputted motion sequence of the pointing device is converted to a motion vector sequence and compared with stored motion vector sequences to retrieve one or more scenes in which an object moves with a matching motion.

11 Claims, 15 Drawing Sheets

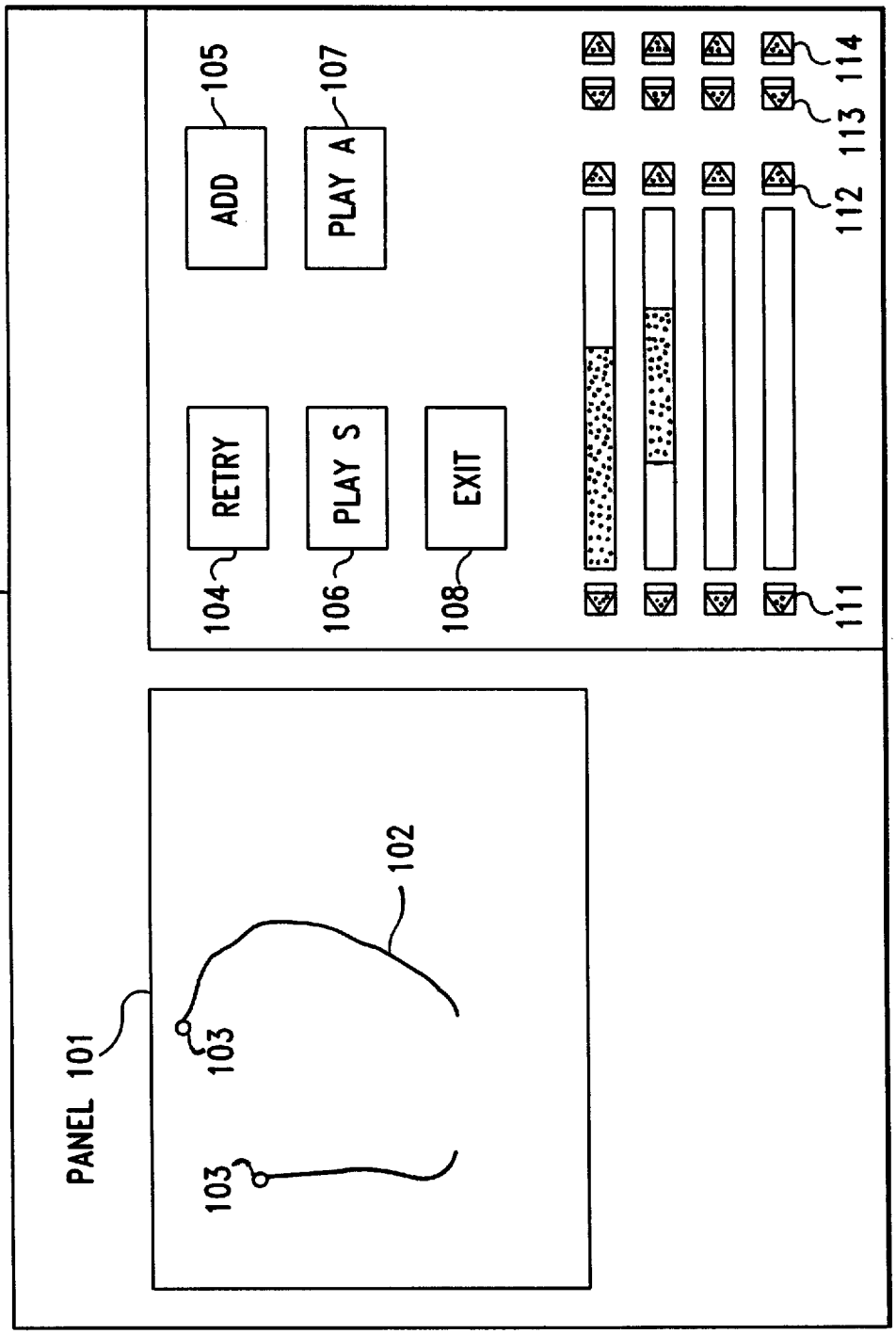

— · · — · · — STORED MOTION
————— QUERY MOTION

——·——·—— STORED MOTION
———————— QUERY MOTION

——·——·—— STORED MOTION
················ QUERY MOTION
———————— QUERY MOTION REPLACED BY MAPPING F

FIG.18

| SCENE NUMBER | SEQUENTIAL RELATION |
|---|---|
| ⋮ | |
| SCENE N | S0 = S1 < S2 = S3 |
| ⋮ | |

FIG.20

| SCENE NUMBER | R1 | R2 | R3 | R4 |
|---|---|---|---|---|
| ⋮ | | | | |
| SCENE N | S0 | | S1,S3 | S2 |
| ⋮ | | | | |

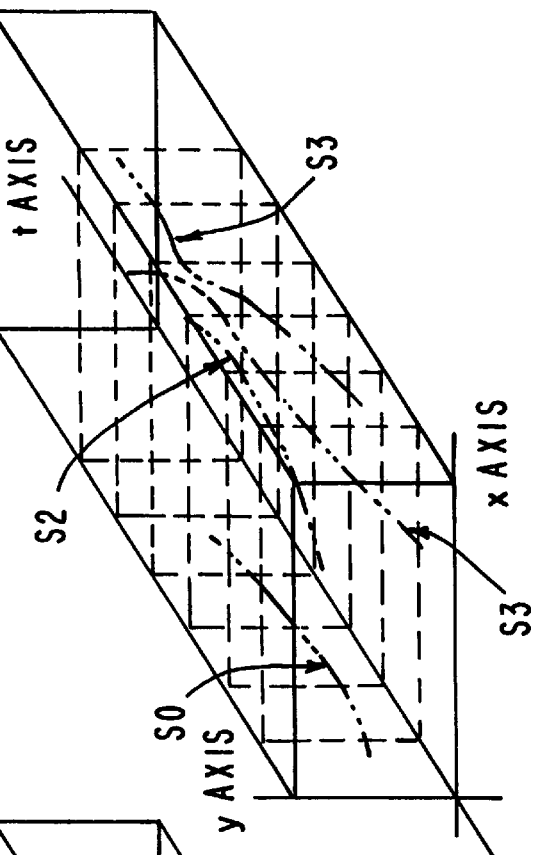
FIG.19A
FIG.19B
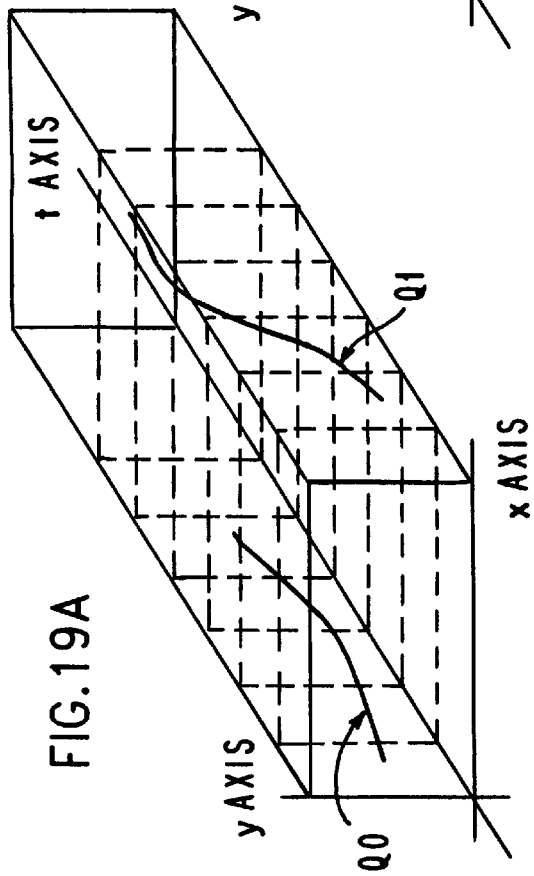
FIG.19C
FIG.19D

PICTURE QUERY SYSTEM USING ABSTRACT EXEMPLARY MOTIONS OF A POINTING DEVICE

DESCRIPTION

Field of the Invention

This invention relates to a system and a method for retrieving a portion or portions of a motion image by using, as a query condition, motion information that a user inputs by changing the spatial position or a device such as a mouse.

BACKGROUND OF THE INVENTION

A procedure for describing a query condition by means of a key word, as shown in FIG. 1, is a known method of retrieving a scene, that is to say, a portion of a stored motion image. According to the method, a motion image (a sequence of frames) is stored in a motion image database 12, while, in order to allow retrieval by means or key words, the contents of each scene are described (step 10), and the description of the contents is registered in a character/numeric database 11 together with the storage address of the scene. When retrieving a scene, a query condition using key words is input (step 13), and the key words are matched with the description stored in the character/numeric database 11 (step 14). A matched scene is displayed by accessing the storage address of the scene in the motion image database 12 (step 15). This method, however, involves the following problems:

First, a person must describe the contents of a motion image in words as he/she observes it. This is very time-consuming. Moreover, since not all motion images are described by a single person, individual differences occur in descriptions of contents, resulting in a lack of neutrality and objectivity. Further, since the user, in general, is not the person who described the contents, a user's input description is often inconsistent with the description in the database. This causes a low hit ratio.

Later studies try to describe information on the notions of objects appearing in a motion image instead of describing the contents of a scene. A motion image retrieval procedure disclosed by JA PUPA 1-224875 tries to store the physical states of objects appearing in a motion image in a database and retrieve them by using a logical conditional formula that describes changes in the states of specific objects. Changes in the state of an object are specifically a time series of two-dimensional coordinates of the object, and are stored in a motion information database. All a user has to do is to describe a query condition in words. The query condition is automatically converted into a conditional formula, and a scene that contains an object undergoing state changes consistent with the conditional formula is retrieved. However, it is difficult for a user to express an object's motion in words or in a logical conditional formula.

Assume, for example, that it is desired to accurately retrieve a scene in which an object S that existed at coordinates (x1, y1) on a screen at time t1 has moved to coordinates (x2, y2) at time t2 while tracing a curve. In this case, it is not sufficient to input conditions defining two distinct points in time and space and the fact that the object has moved between them. Transitional positions during the object's motion and its speed must also be expressed. However, it is almost impossible for a user to fully express them in words or numerical values.

The procedure described in the publication also requires the name of the object to be specified in the query condition. Therefore, unless the user knows the exact registered name for the object, he/she will fail in retrieval.

Additionally, although the publication claims to extract the two-dimensional coordinates of an object appealing on a screen for each frame, it does not present any automatic extraction procedure. Even if an environment is established for a retrieval operator to transfer his/her desired motion to a computer, the system is still impractical and requires much labor to be devoted to extracting motion information from a motion image.

DISCLOSURE OF THE INVENTION

It is therefore an objective of the present invention to enable a user to input his/her intended motion as a query condition when he/she retrieves a motion image, and thereby to increase the flexibility of retrieval.

Another objective of the invention is to enable a user who does not know the name of an object to retrieve it by using a motion as a condition.

Another objective of the invention is to reduce the human labor and ensure the objectivity of the contents of the motion information to be stored, by employing an automatic procedure for constructing a motion information database, which is essential for retrieval in which a motion is used as a condition.

BRIEF DESCRIPTION OF THE DRAWINGS

FIG. 10 is a diagram showing a query condition editing screen.

FIG. 18 is a diagram showing the construction of an index file that stores the time sequential relations among stored motion indices.

FIG. 19 is a diagram explaining how to relate query motion indices to stored motion indices when a plurality or query motion indices exist and their positional relation is taken into consideration.

FIG. 20 is a diagram showing the construction of an index file that stores the positional relations among stored motion indices.

BEST MODE OF CARRYING OUT THE INVENTION

Figure 1:
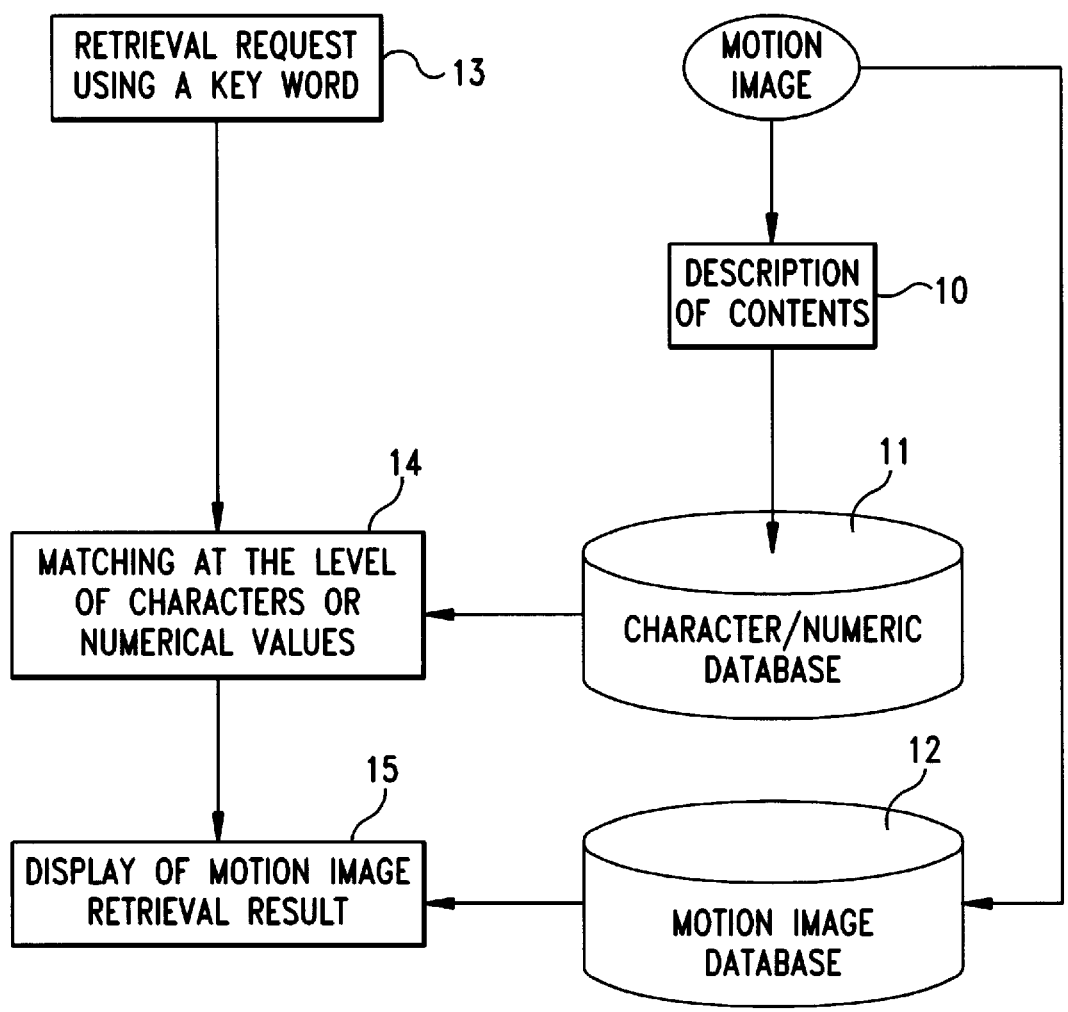
FIG. 1 is a block diagram showing the process and data flow in a prior art motion image retrieval technique.
Figure 2:
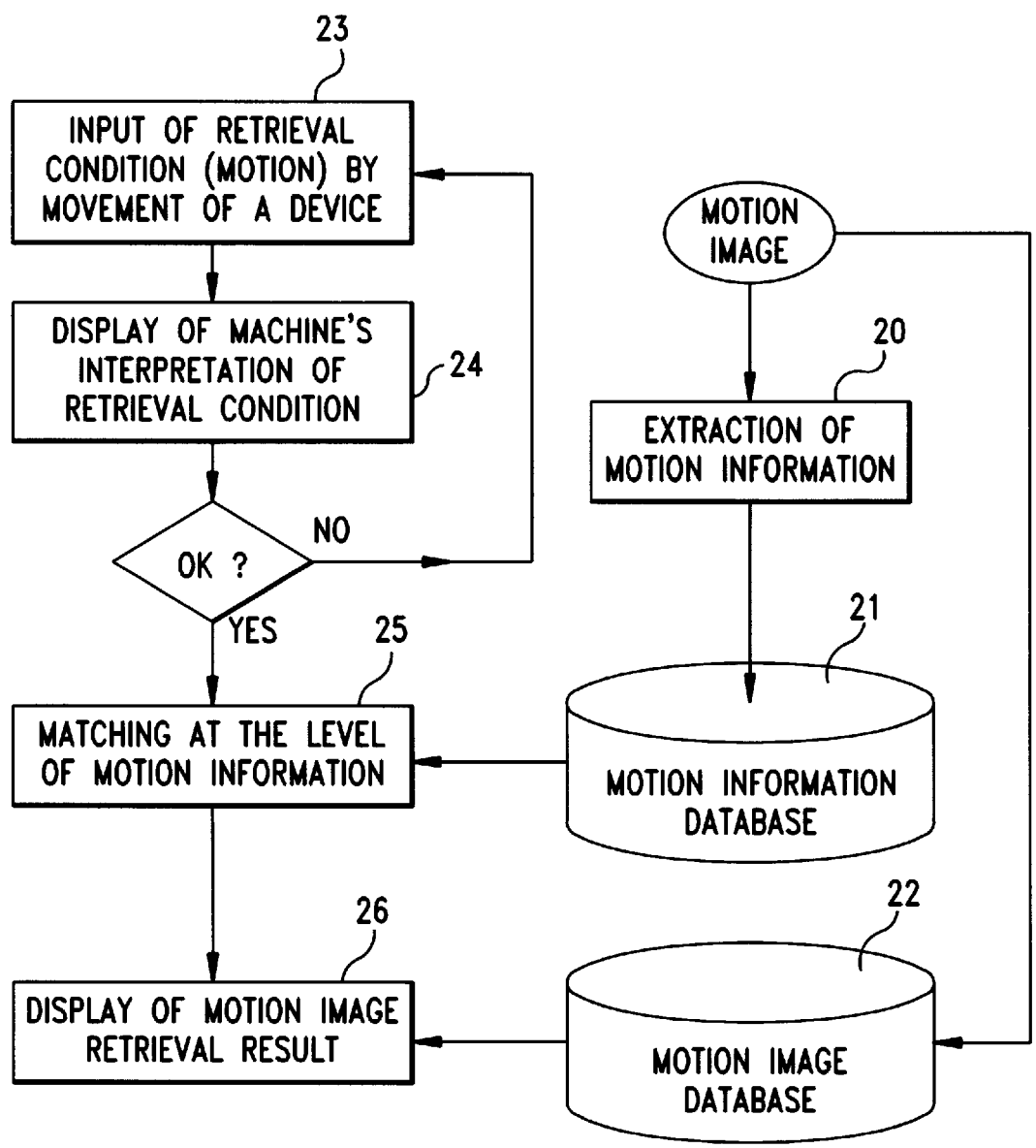
FIG. 2 is a block diagram showing the process and data flow in the invention.

FIG. 2 shows the process and data flow in the procedure according to the invention. A motion image is stored in a motion image database 22. At the same time, information on the motion of an object is extracted from the motion image by an image processing technique, and is stored in a motion information database 21.

Extraction of motion information (step 20) includes the following three steps, A, B, and C:

A: A motion image consisting of a sequence of frames is divided, according to a predetermined criterion, into partial motion images each consisting of a sequence of frames whose number is smaller than that of the original motion image. Scene changes are generally taken as the criterion for division.

The subsequent steps B and C are performed for each partial motion image. Step C may be omitted; however, in order to increase the efficiency of retrieval, it should preferably be included.

B: The screen is first divided into blocks, and motion vector sequences are generated by tracing their motions. Next, a vector sequence representing the motion or the object is automatically generated by combining motion vector sequences representing similar behavior. Data generated for a single representative vector sequence include a time series of interframe displacements (representative motion vectors), the number of the starting frame of the motion, the number of frames in which the motion continues, and the coordinates of the starting point of the motion in the starting frame.

C: Next, a motion index is generated by sampling representative motion vector sequence data at intervals longer than the frame sampling intervals. Data generated for a single motion index include a time series of vectors each representing a motion in the corresponding sampling interval, the starting time or the motion, the duration of the motion, and the coordinates of the starting point of the motion.

A motion information database is built by storing three associated pieces of information: an identifier of the partial motion image, data indicating the storage location of the partial motion image, and its motion index.

In order to execute retrieval by using a motion as a query condition, a user employs a device whose spatial position can be changed. The user inputs as query conditions the starting position of a desired motion, its ending position, positions during the motion, and the amount of time required for the motion, by moving the device from a desired position to a different desired position (step 23). He/she need not input the name of the moving object. The input conditions are displayed on a screen of a display unit (step 24). As a result, the conditions can be confirmed and reentered or edited and retrieval becomes more flexible. Matching is performed between the input conditions and the motion data stored in the motion information data base 21, and the distance from the input conditions is determined for each scene (step 25). As a result, scenes are displayed in ascending order of distance (step 26).

Figure 3:
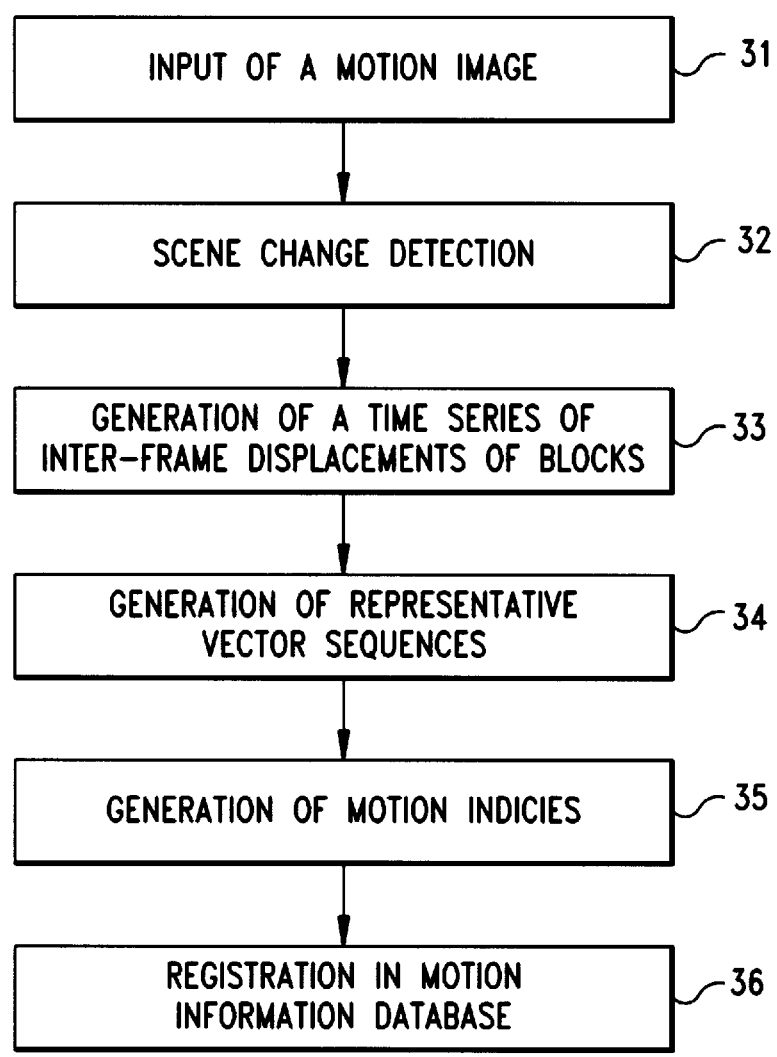
FIG. 3 is a diagram showing the process flow of motion information extraction.

1. Extraction of Motion Information and Storage Thereof in a Motion Information Database:

Explained below are details of step 20 of FIG. 2, with reference to the process flow shown in FIG. 3.

a) Input of a Motion Image (Step 31):

A motion image is first input from a storage medium into a process unit. If the motion image is stored in the form of analog signals, a process for converting them into digital signals beforehand is required.

The method or storing the motion image in the motion image database 22 is not a subject or the invention, and its detailed explanation is omitted. Note, however, that the invention is not dependent on the storage unit that is used for constructing the motion image database 22 or the way in which it is used. Not only the image data but also audio data and time data synchronous with the picture may be included in the motion image database 22, and those data may be compressed as required.

Figure 4:
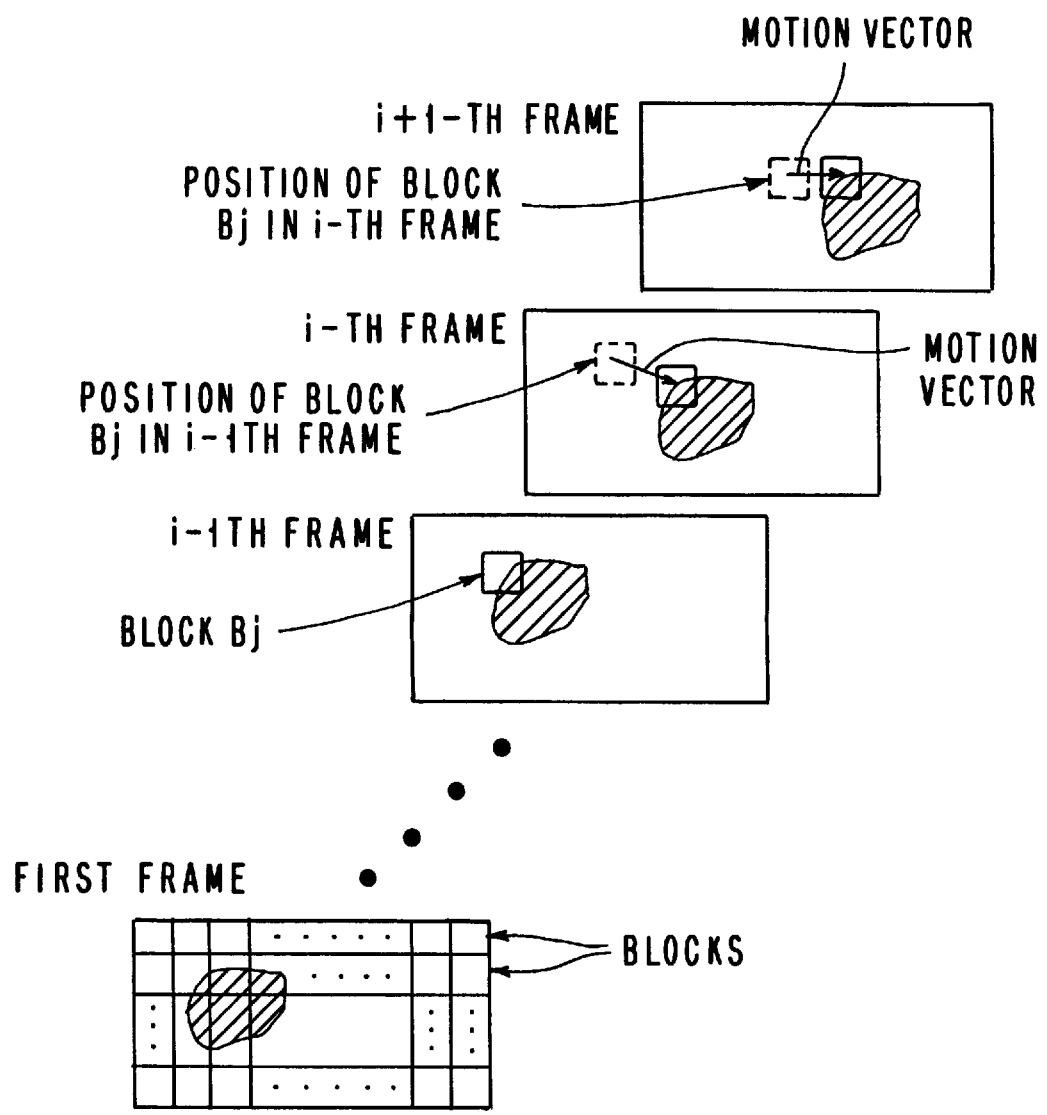
FIG. 4 is a diagram explaining blocks and their motions during a motion vector generating process.

In the embodiment, image data of a desired frame stored in the motion image database 22 are accessed by using a storage address that is generated from the frame number. Conversion from the frame number to the storage address may be performed by using a table. Alternatively, the storage address of the image data may be calculated from the frame number by using the method disclosed in JA Patent Application 3-156214.

b) Detection of Scene Changes (Step 32):

Next, a process for detecting scene changes in the motion image is executed whereby the starting frame number and the number of frames in each scene are output. In this embodiment, a period from one scene change to the next is regarded as one period, and the movement of the object is tracked for each period. For detection of scene changes, the existing technique disclosed in JA PUPA 3-73076 may be used.

c) Generation of Motion Vector Sequences (Step 33):

Subsequent processing is executed for each scene. First, as shown in FIG. 4, the starting frame of a scene to be processed (target scene) is divided into equal-signal blocks. The size of each block is normally between 8×8 pixels and 32×32 pixels.

Next, the current frame and the immediately preceding frame are compared for each block to find the vector that minimizes the difrerence. If such a vector is found, the on-screen position of the block in the current frame is calculated from the on-screen position or the block in the preceding frame and the found vector. These steps are iterated. In the embodiment, the difference is defined by the following formula (1):

$$\epsilon \in \{Si(x-dx, y-dy) - Si-1(x, y)\}**2 \qquad (1)$$

where x and y are coordinates on the screen, $Si-1(x, y)$ is the pixel value of the coordinates (x, y) in the (i−1)-th frame (the immediately preceding frame), and $Si(x, y)$ is the pixel value or the coordinates (x, y) in the i-th frame (the current frame). **2 means the power 2. By substituting various values for dx and dy in formula (1) and by calculating the above difference, the two-dimensional vector (dx, dy) that minimizes the difference is selected as the motion vector of the block. The range or values for substitution of dx and dy may be determined appropriately.

Since the block Bj has moved to (x+dx, y+dy) in the i-th frame, a similar process is performed between the i-th frame and the (i+1)-th frame by using the coordinates (x+dx, y+dy) instead of the coordinates (x, y), in the i-th frame to search for a motion vector (dx, dy) between the frames.

As a result or the process, motion vector sequences (lines) are obtained throughout the target scene of the target block in a three-dimensional space (a spatio-temporal space, hereinafter called ST space) having on-screen xy axes and a time axis t. Among the motion vector sequences generated, those for which the ranges of the projected motions onto the xy plane are too small and those for which the durations of the motions are too short are discarded, and only vector sequences representing effective motions are maintained.

Some objects may appear on the screen in the middle of a scene. To cope with such objects, the embodiment checks the distribution of blocks on the xy plane every M (a predetermined number not smaller than 2) frames and, if any region without blocks exists, generates new blocks there. By tracing newly generated blocks, the motion vector sequences of objects appealing in the middle of a scene can be generated.

d) Generation of Representative Motion Vector Sequences (Step 34 of FIG. 3):

In general, since a single object occupies a plurality or blocks on the screen, a plurality of motion vector sequences are generated for each object. Motion vector sequences generated for the same object represent similar behavior. Therefore, vector sequences representing similar behavior arc combined, and one or more representative motion vector sequences are generated for the object. For this purpose, it is necessary to introduce distances among motion vector sequences of blocks. In this embodiment, the distance of motion vector sequences is defined by tie following formula:

$$\epsilon(xik-xi1)^{}2+(yik-yi1)^{}2 \quad (2)$$

where xik and yik are the x coordinate and the y coordinate of a block Bk in the i-th frame, and xi1 and yi1 are the x coordinate and the y coordinate of another block B1 in the i-th Frame. The range of the frame number i, that is, the range for which distance calculation is to be executed, is the period in which the motion vector sequences of two blocks overlap.

Figure 5:
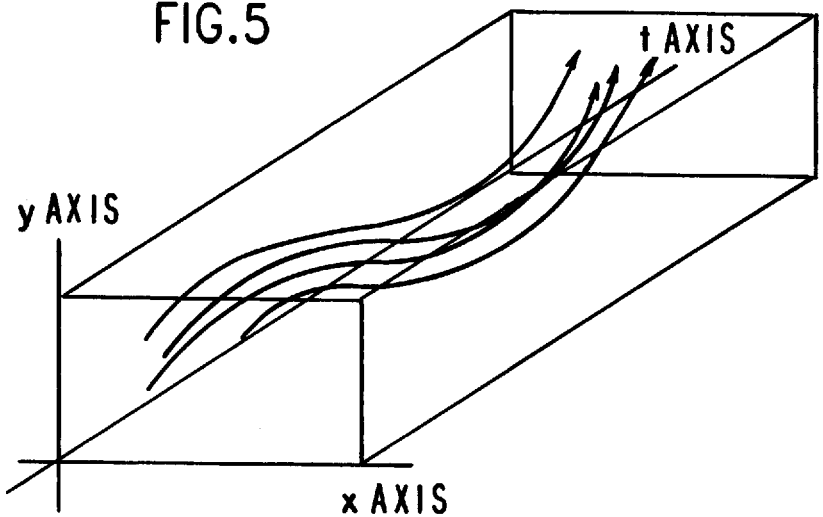
FIG. 5 is a diagram showing the motion vector sequences of blocks in an ST space.
Figure 6:
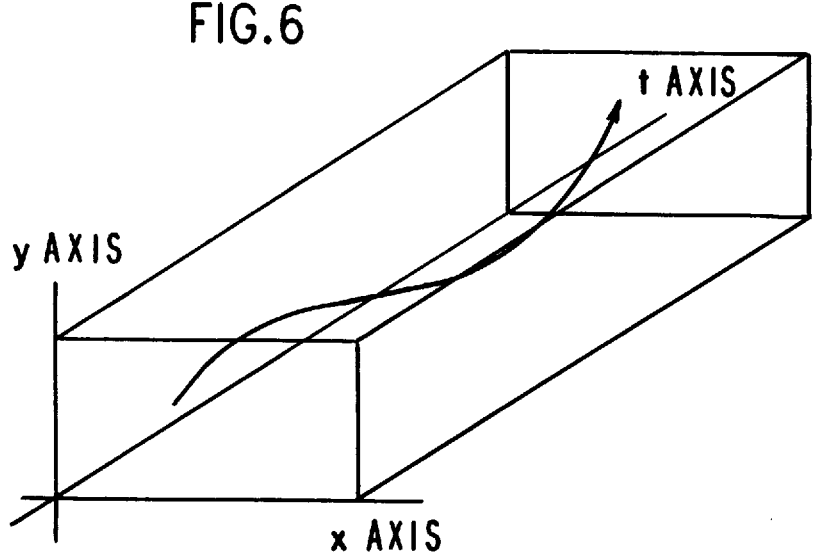
FIG. 6 is a diagram showing a representative motion vector sequence in the ST space.

On the basis of the distance between the block motion vector sequences calculated by formula (2) and by using a known cluster analysis technique, the block motion vector sequences separated by a small distance, that is, those indicating similar behavior, can be combined into a single vector sequence. For example, the four motion vector sequences shown in FIG. 5 are combined into the single vector sequence shown in FIG. 6. A vector sequence generated in this way is called a representative motion vector sequence, and each of the vectors (interframe displacements) constituting the representative motion vector sequence is called a representative motion vector. Data issued for a single representative motion vector sequence are the starting frame number fs of the motion, the number of frames fn in which the motion continues, the coordinates (x0, y0) of the starting point of the motion in the starting frame, and the sequence of representative motion vectors (dxi, dyi) i=0, . . . , fn−1 from these coordinates in the starting frame up to the final frame. Hereinafter, fs and fn are replaced by the time concepts ts (starting time) and t1 (duration of motion).

Figure 7:
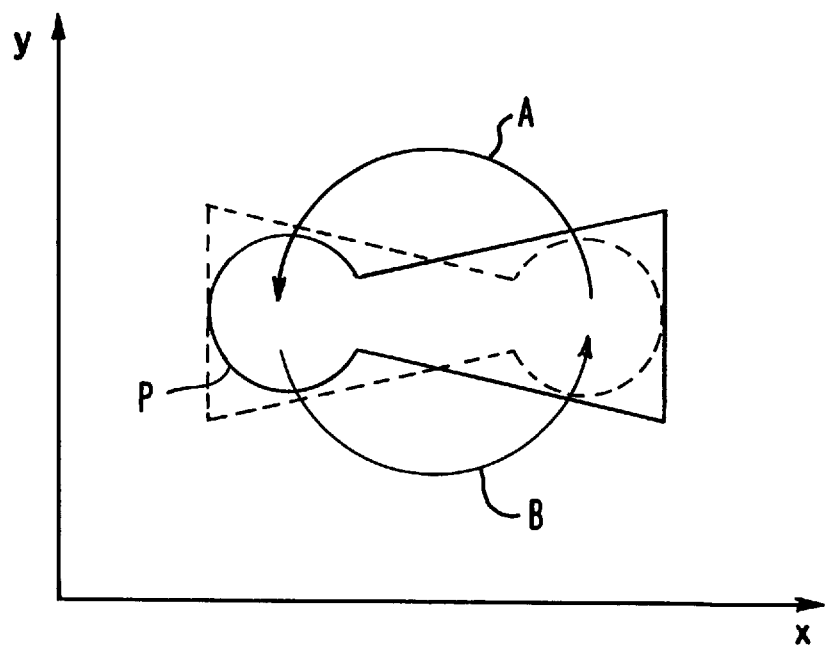
FIG. 7 is a diagram slowing an example of representative motion vector sequences generated from a rotating object.

Note that a plurality of representative motion vector sequences are obtained from a motion of a single object. An example is schematically explained with reference to FIG. 7.

When an object P is rotated through 180 degrees, from the position shown by the broken line to the position shown by the solid line, two representative motion vector sequences, A and B, are obtained.

e) Generation and Registration of a Motion Index (Steps 35 and 36 of FIG. 3):

In order to increase the efficiency of the retrieval process described later, the embodiment samples data on each representative motion vector sequence at time intervals Tint that are longer than the frame sampling intervals. A rough vector sequence generated as a result of the sampling is hereinafter called a motion index. A motion index contains the following three kinds of data: (1) starting point coordinates (Isx, Isy), (2) starting time and duration of motion (Its, It1), and (3) a time series of the sum of representative motion vectors in the time interval Tint (Iv0, Iv1, . . . , Ivn), where Ivk=(Ixk, Iyk). Here:

$$Isx=x0, Isy=y0; Its=ts/Tint, It1=t1/Tint; Ixk=\epsilon dxi \quad (3)$$

$$Iyk=\epsilon dyi$$

Figure 8:
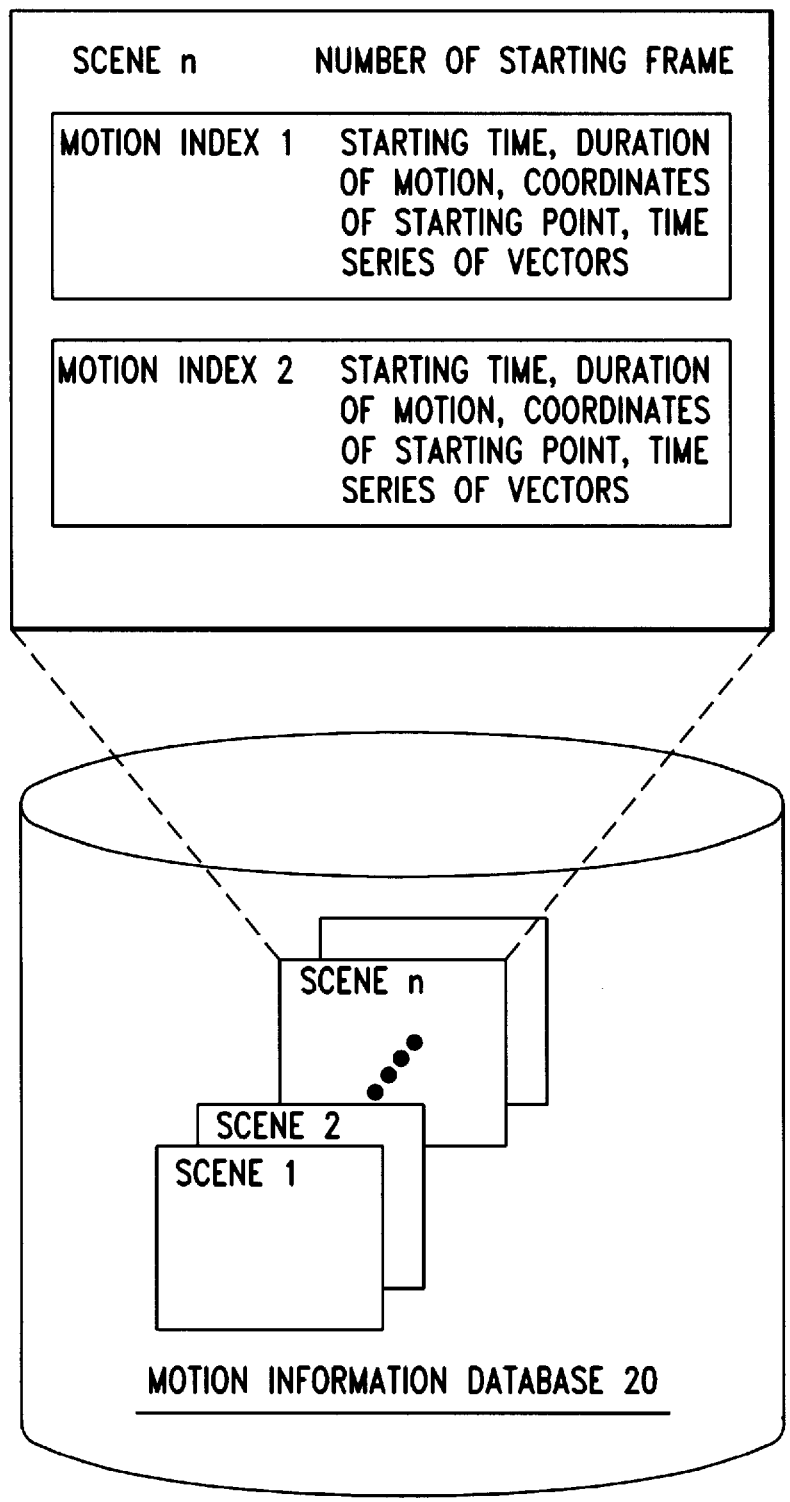
FIG. 8 is a diagram explaining the construction of a motion information database.

The time interval of the interframe displacement or a representative motion vector sequence coincides with the frame sampling interval, which is normally approximately ⅟30 second. Most objects move smoothly, and human vision cannot perceive changes in units of several tenths of one second. Therefore, the use of data sampled at rough time intervals does not cause any problem in terms of the retrieval, but rather contributes to a decrease in the matching cost. For this reason, the embodiment registers in the motion information database 21, for each scene, its scene number, the number of the starting frame of the scene, and the motion index extracted from the scene, as schematically shown in FIG. 8. What kind of medium is used in a storage unit to actually realize the motion information database 21 is a question or design, and explanation thereof is omitted.

Figure 11:
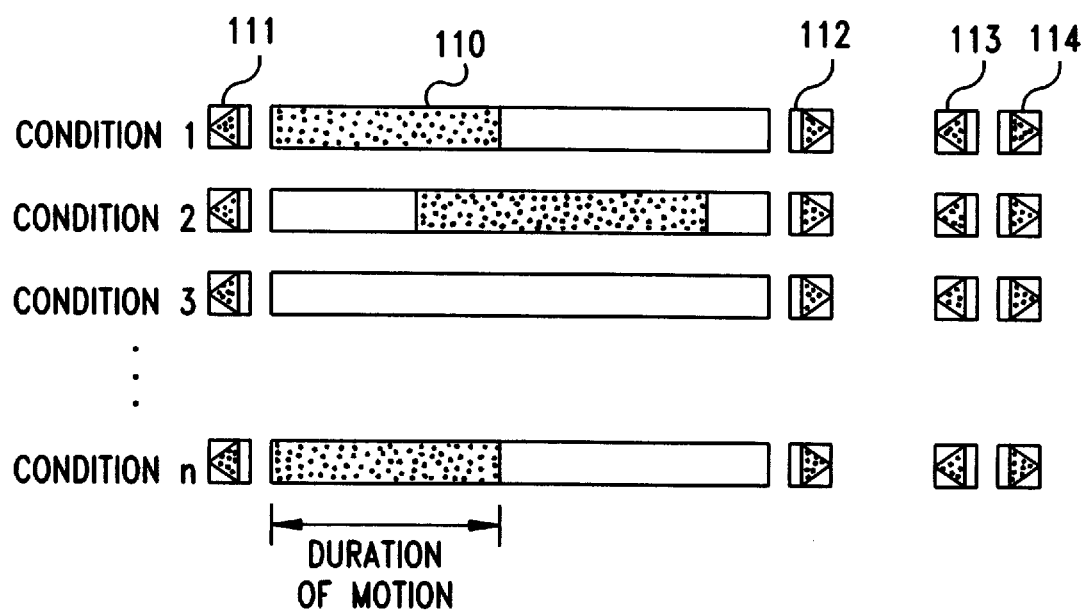
FIG. 11 is a diagram showing a part of the query condition editing screen.
Figure 9:
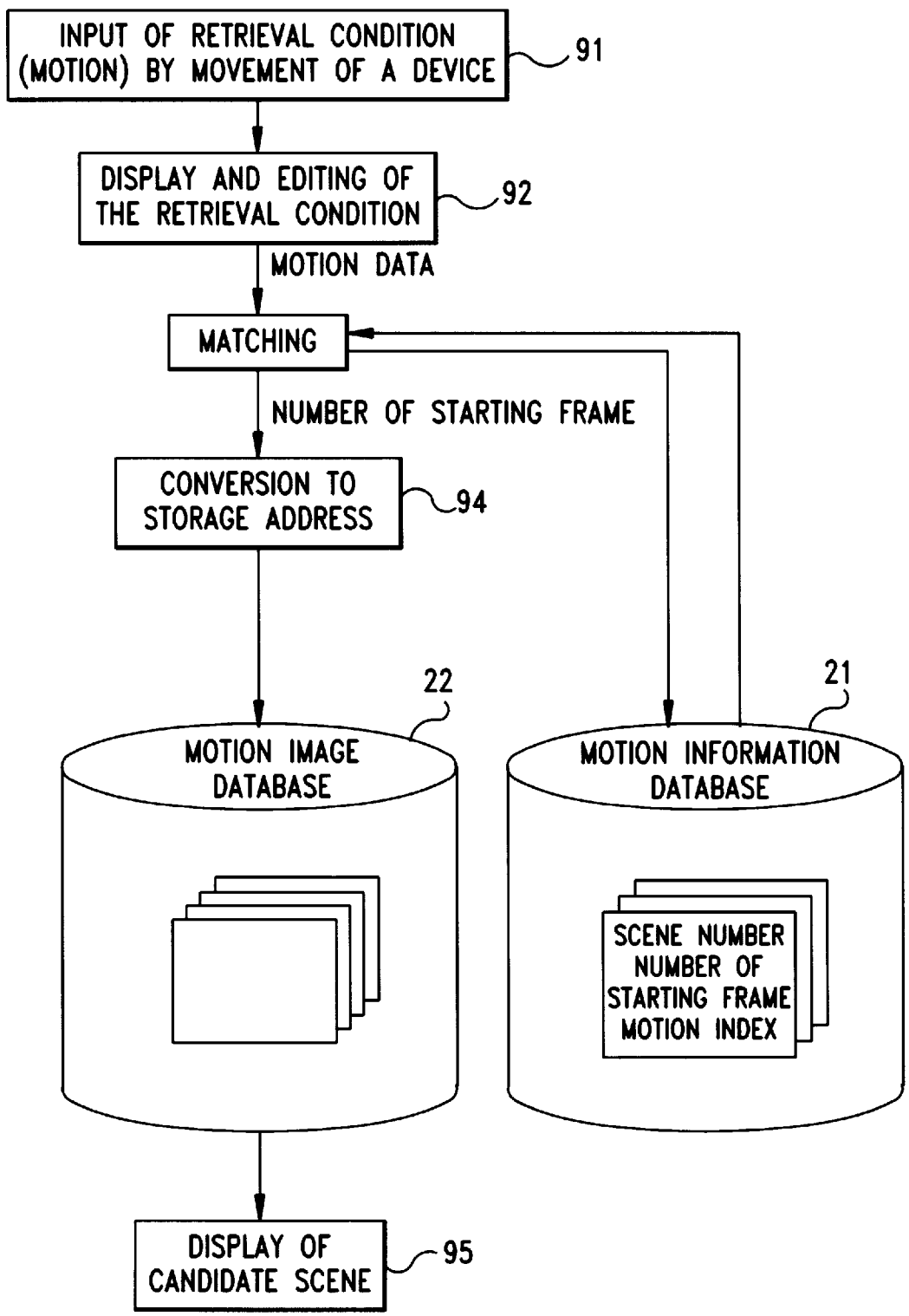
FIG. 9 is a block diagram showing the retrieval process and data flow.

2. Retrieval Using a Motion as a Query Condition:

Details of steps 23, 24, 25, and 26 of FIG. 2 are explained below, with reference to the process flow shown in FIG. 9.

a) Input of Query Conditions (Step 91):

Actual motion images observed by persons are two-dimensional, and motion images that can be processed by computers are also two-dimensional. For this reason, the embodiment sets a two-dimensional panel 101 on a display screen 100 so that a user can draw a desired motion thereon by moving a suitable device. As a result since the invention expresses a motion in terms of a vector sequence, a line is drawn on the panel 101. A cursor (not shown) is displayed on the panel 101, and its position is echoed back onto the panel 101 in response to a motion of the device. A computer senses the coordinates of the starting point of the cursor's, motion on the panel 101 and the coordinates thereof at every predetermined time during motion. As a result, the duration of motion and coordinates at predetermined intervals during motion are input as conditions.

b) Display and Editing of the Results of Machine's Interpretation of the Query Conditions (Step 92):

When a query condition is input by moving the device, there may be a difference between the condition intended by the user and the condition interpreted by a machine. Moreover, when a plurality of conditions are input, it is necessary to consider the time relationship (sequential relationship) of two or more time series vectors, and simultaneous specification of a plurality of conditions is difficult. Therefore, it is necessary to provide an interactive editing function that permits a user to first input conditions, then modify their sequential relationships and the durations or the like, via an interface, and reproduce the results for confirmation. An example of an interactive editing function is shown in FIGS. 10 and 11. Here, a motion is indicated by a scroll bar 110, which indicates the starting time of the motion by the position or its head and the duration of the motion by its length. Therefore, positional relations among scroll bars indicate sequential relations of corresponding conditions (notions). By changing the length of the scroll bar 110 or moving the position thereof, the user can modify the duration of a motion used as a query condition, that is, the speed of the motion, or can express sequential relations among motions.

More specifically, buttons 111 and 112 are used for moving the position of the scroll bar 110. By pressing the button 111, the scroll bar 110 can be moved to an earlier point by a predetermined unit of time. By pressing the button 112, the scroll bar 110 can be moved to a later point by a predetermined unit or time. Buttons 113 and 114 are used for changing the length of the scroll bar 110. By pressing the button 113, the scroll bar 110 can be extended by a predetermined unit of time. By pressing the button 114, the scroll bar 110 can be shortened by a predetermined unit of time.

Above the scroll bar 110 on the display screen 100 are provided the "Play S" button 106 and the "Play A" button 107. When the button 106 is pressed, the motion currently being edited is reproduced as a line 104 on the panel 101. More specifically, a small circle 103 representing an object moves at a modified speed, and its track is displayed as a line 102. When the button 107 is pressed, all the motions currently being edited are reproduced on the panel 101 at the edited speed in the edited sequential relations. The following additional editing buttons are provided: the "Retry" button 104 for canceling an input motion, the "Add" button 105 for adding a motion, and the "Exit" button 108 for terminating editing work. The user makes a pseudo-motion image on the panel 101 by using these buttons to iterate editing manipulations. This pseudo-motion image is hereinafter called a query scene.

As a result of input and interactive editing, coordinate data on the starting time, duration, and time series that represent a motion in the pseudo-motion image (query scene) made on the panel 101 are obtained. Query motion indices are generated by sampling of the data at time intervals Tint.

c) Matching Process (Step 93):

In the process up to step 92, the description of motions in the query scene has the same configuration as that of motions in the scene stored in the motion image database 22. In step 93, candidates are determined by using them. A procedure for this is explained below.

A set of motion indices contained in a certain stored scene is referred to as (SV0, SV1, . . . ), and a set of motion indices contained in a query scene as (Qv0, Qv1, . . . ). Each motion index v is the set of the following data:

$$V=(Isx, Isy, It1, It1, M), M=(Iv0, Iv1, \ldots, Ivn) \quad (4)$$

where Isx and Isy are the coordinates of the starting point, Its and It1 are the starting time and duration of the motion, and Ivk=(Ixk, Iyk) indicates the displacement in each time interval Tint.

For simplicity, an example in which a query scene contains only one motion is explained below. In the following respective formulas, data on the motion in the query scene are expressed by prefix Q while data on the motion in the stored scene are expressed by prefix S (for example, the coordinates QIsx, QIsy of the starting point of the query side). A motion contained in a query scene is hereinafter called a query motion, while a motion contained in a stored scene is called a stored motion.

Data on the motion supplied by the retrieval interface shown in FIG. 10 may be considered to be a user's way of expressing in terms of a vector sequence the statement that "a certain object has moved from a certain position in a certain way in the period t1." The constraints presented therein are of three kinds: (1) time (position on the time t axis), (2) position (position on the xy plane), and (3) motion (vector sequence). The distance d between the query motion and the stored motion is calculated by the procedures shown below, and the degree of similarity is determined on the basis of the result.

Figure 12:
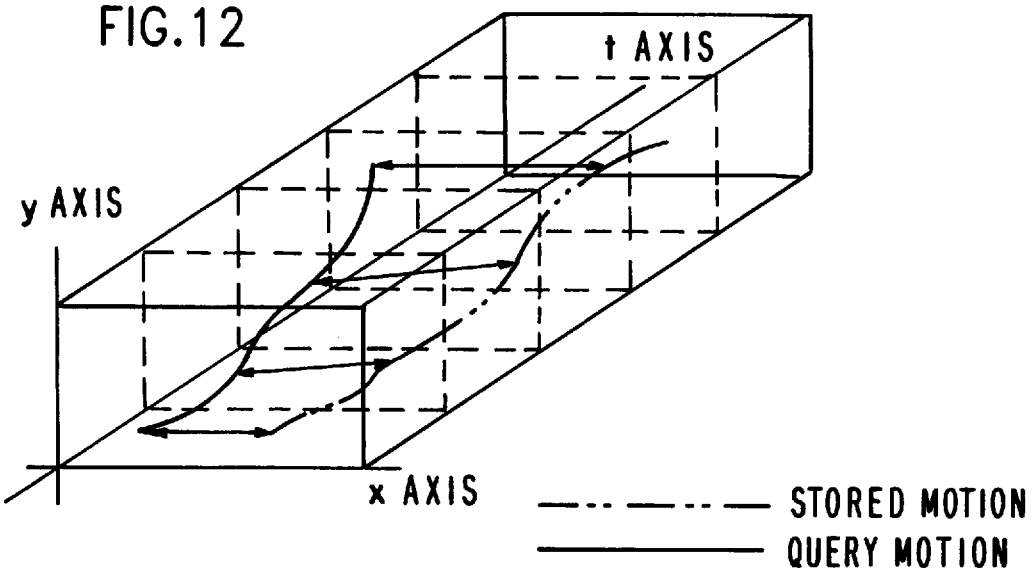
FIG. 12 is a diagram explaining an example of the definition of distances in the ST space between stored motion indices and query indices.

(i) When a User is Aware of Constraints on Position and Time:

By moving QIts and SIts to the origin of the time axis on the ST space, the distance d is computed by the following formula (5) (see FIG. 12):

$$d=\epsilon|(SIsx+SIxk)-(QIsx+QIxk)|2+|(SIsy+SIyk)-(QIsy+Qiyk)|2 \quad (5)$$

When SIt1>QIt1 or SIt1<QIt1, the definition of the left side of equation (5) may be (i) the rejection (d=infinity), (ii) calculation only on portions that overlap in time, or (iii) dealt with otherwise. Which definition should be employed depends on the applications.

Figure 13:
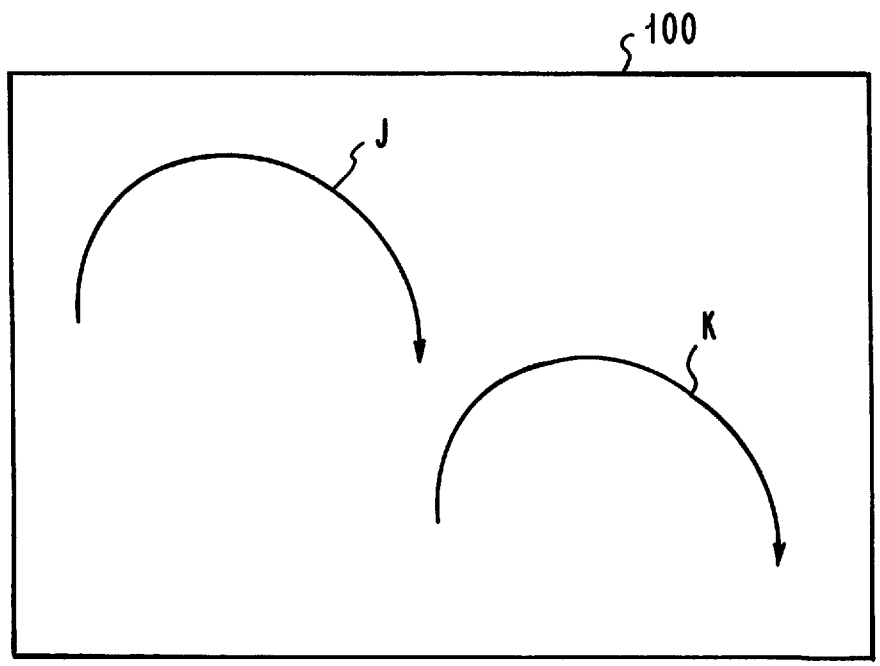
FIG. 13 is a chart showing a projection or two motions onto an XY plane.
Figure 14:
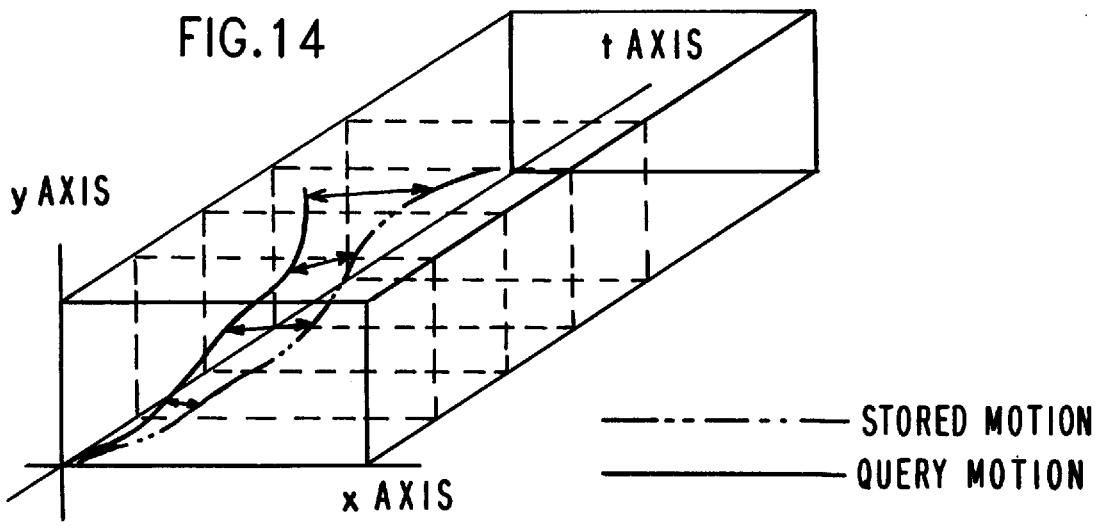
FIG. 14 is a diagram explaining an example of motion indices and query indices.

(ii) When a User is Not Aware of a Constraint on Position:

An example is the case in which a user wants to retrieve a scene without discriminating between motions J and K in FIG. 13. By bringing to the origin or the ST space the coordinates Isx, Isy or a stored motion and a query motion, respectively, only pure motions (vector sequences) are compared (see FIG. 14). In this case, d is computed by removing the terms SIsx, SIsy, QIsx, and QIsy in equation (5).

(iii) When a User is Not Aware of a Constraint On Time (Speed of Motion):

Two motions are matched in terms of time. That is, time matching is performed between SIt1 and QIt1. In this case, if the time is to be changed simply linearly, the value of QIt1 is extended or shortened to coincide with SIt1, and a vector sequence QIvk'=(QIxk', QTyk') is remade from a vector sequence QIvk=(QIxk, QIyk) to match the modified value of QIt1. If non-linear transformation of the time is permitted, a vector sequence QIvk'=(QIxk', QIyk') is made by using a known DP matching method or the like. When the transformation function is F, $$QIxk'=F(QIx0, QIx1, \ldots, QIxj) \quad (6)$$

$$QIyk'=F(QIy0, QIy1, \ldots, QIyj)$$

$$(k'=0,1, \ldots, SIt1, j=0, \ldots, QIt1).$$

By making QIt1 match SIt1 in this way, the distance d can be computed from equation (5) by defining the computing interval to be SIt1.

Figure 15:
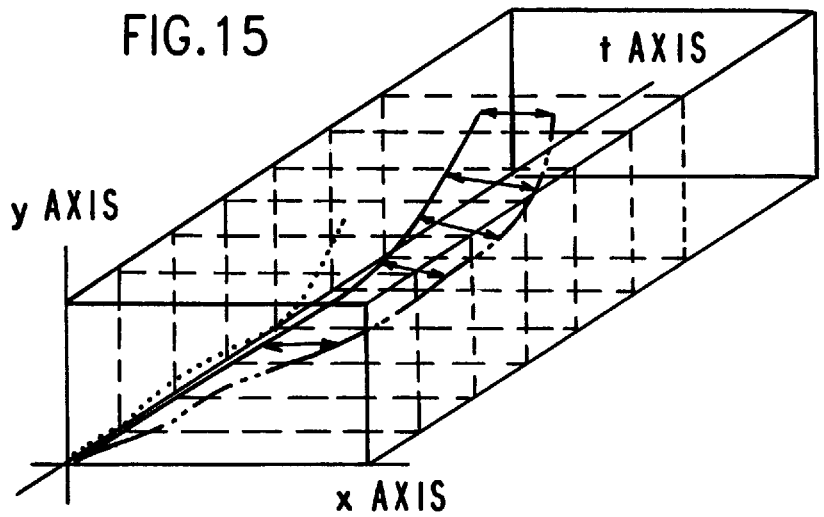
FIG. 15 is a diagram explaining another example of the definition of distances in tie ST space between stored motion indices and query indices.

(iv) When a User is Aware of Constraints on Neither Position Nor Time:

As shown in FIG. 15, the query motion is matched with the stored motion both in position and in time.

If an ambiguity exists in position and time in a query condition, a vector sequence (line) in the ST space is transformed to render the query condition comparable with the stored motion index before their distance is obtained. After the distance calculation has been iterated for all the stored vector sequences, scenes containing the vector sequences are selected as candidates in ascending order or distance.

The degree of ambiguity of query conditions is considered to vary with specific cases. It is therefore preferable to provide an interface that explicitly designates ambiguity. For example, a user can specify through a menu that the time and position of query conditions should be indefinite, and in response the system will perform distance calculation by one of the above procedures (i) to (iv).

Figure 16A:
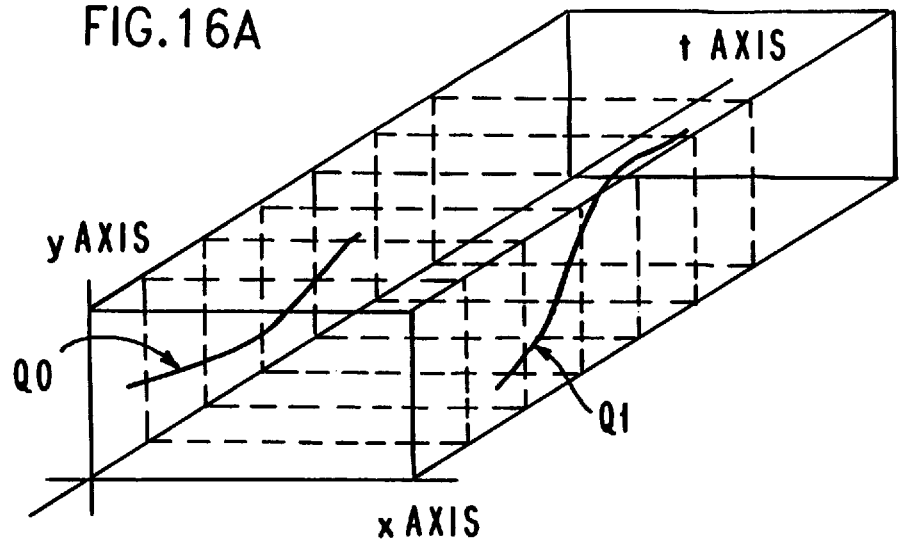
FIG. 16 is a diagram explaining how to relate query motion indices to stored motion indices when a plurality of query indices exist.
Figure 16B:
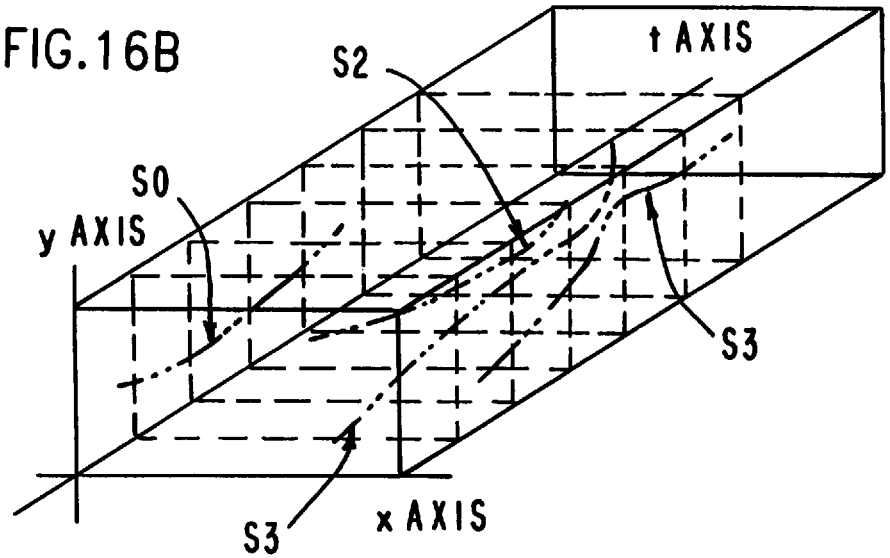

When a plurality of query conditions are input, a distance scale can be set for each corresponidil)g pair of a stored motion and a query motion by performing the same distance calculation. In this case, however, consideration must be given to the resulting increase in the number of combinations. For instance, in the example in FIG. 16, the query scene contains motions Q0 and Q1, while the stored scene contains motions S1, S2, and S3. If no condition is added, there are twelve possible combinations of the two query motions and two stored motions, as shown below, and distance calculation must be performed twenty-four times.

[1]  (Q0, S0)   [2]  (Q0, S1)   [3]  (Q0, S2)   [4]  (Q0, S3)
     (Q1, S1)        (Q1, S0)        (Q1, S0)        (Q1, S0)
[5]  (Q0, S0)   [6]  (Q0, S1)   [7]  (Q0, S2)   [8]  (Q0, S3)
     (Q1, S2)        (Q1, S2)        (Q1, S1)        (Q1, S1)
[9]  (Q0, S0)   [10] (Q0, S1)   [11] (Q0, S2)   [12] (Q0, S3)
     (Q1, S3)        (Q1, S3)        (Q1, S3)        (Q1, S2)

Figure 17A:
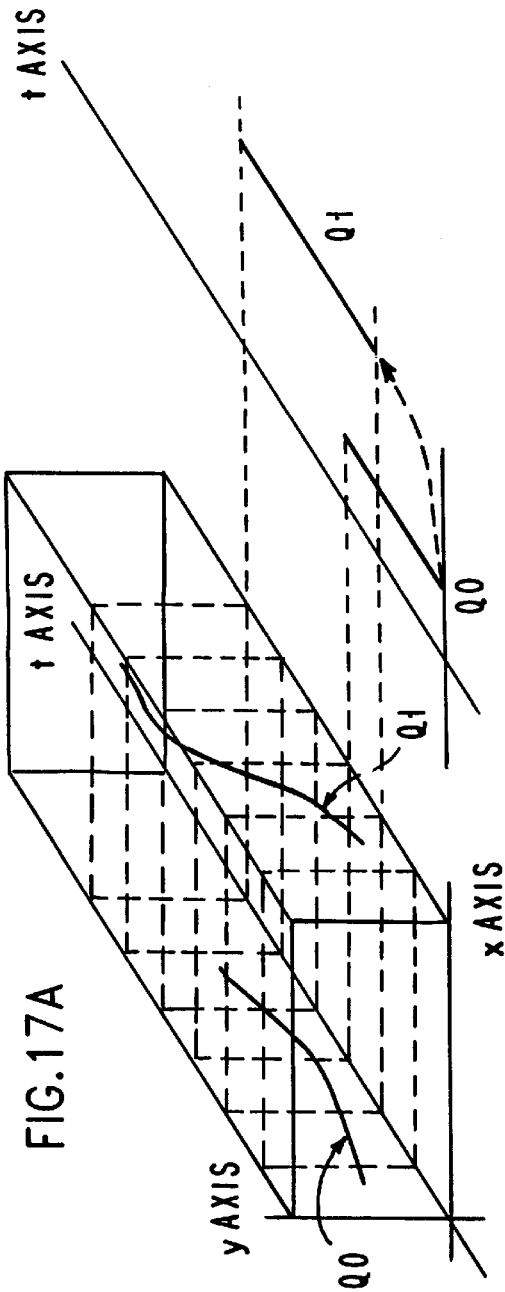
FIG. 17 is a diagram explaining how to relate query motion indices to stored motion indices when a plurality of query indices exist and their time sequential relation is taken into consideration.
Figure 17B:
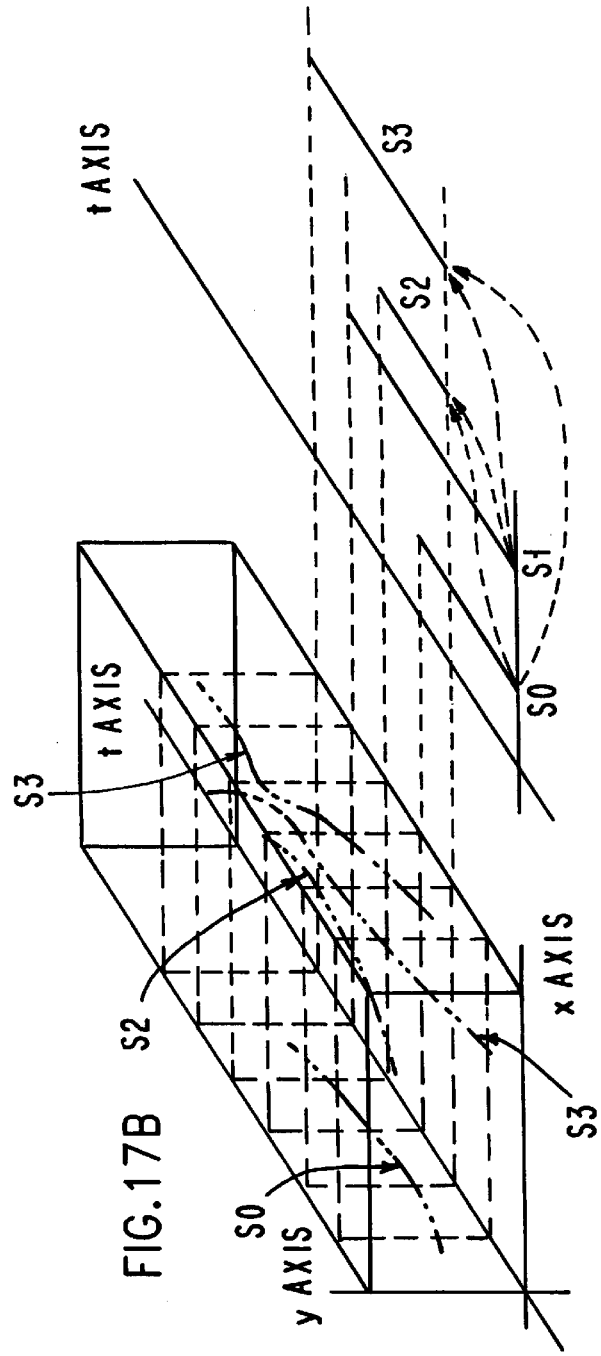

The number of combinations is therefore to be reduced by using information on the time sequential relations between the query motions and/or their positions. The use of the time sequential relations is first explained. The embodiment prepares, beforehand, an index file describing sequential relations in time, on the basis of the values of starting points in time, SIts, of motion indices existing in the same scene. From the motion indices S0, S1, S2, and S3 shown in FIG. 17, the index file shown in Ff. 18 is prepared. If a user is aware of the time sequential relations among query conditions, the index file is used to find a pair of stored motion indices having the same time sequential relation as that of a query condition. Assume, for example, that the user is aware of the sequential relation between (query motions Q0 and Q1. The index file in FIG. 18 shows that there are four pairs of stored motion indices having a sequential relation. Therefore, the combinations of query motions and stored motions that are targets for distance calculation are reduced to the following four pairs:

[1] (Q0, S0)   [2] (Q0, S0)   [3] (Q0, S1)   [4] (Q0, S1)
    (Q1, S2)       (Q1, S3)       (Q1, S2)       (Q1, S3)

Next, the use of positional information is explained. The embodiment prepares, beforehand, an index file that describes in which region starting points (SIsx, SIsy) of stored motion indices are located. The regions are set by dividing a screen. For example, from motions S0, S1, S2, and S3 shown in FIG. 19, an index file (FIG. 20) is prepared which indicates that S0 is related to region R1, S1 and S3 to region R2, and S2 to region R4. R1, R2, R3, and R4 are regions set by dividing the xy plane into four equal parts.

When the coordinates of the starting point of a query motion have been determined, only stored motions whose starting points are near the coordinates can be selected as targets of distance calculation. This helps to reduce the retrieval cost. In the example shown in FIG. 19, assume that a user is aware of the positions of query motions Q0 and Q1. The coordinates (QIsx, QIsy) of the starting points of Q0 and Q1 show that Q0 is related to region R1, and Q1 to region R3. Therefore, the investigation of the index file (FIG. 20) shows that S0 is the stored motion whose starting point is nearest to that of Q0 and that S1 and S3 are the stored motions whose starting points are nearest to that of Q1. Therefore, the pairs of query motions and stored motions that are targets for distance calculation are reduced to the following two:

[1] (Q0, S0)   [2] (Q0, S0)
    (Q1, S1)       (Q1, S3)

For each of the pairs selected as described above, the distances d between their corresponding vectors are calculated, and the sum of them is obtained. The sum that has the smallest value in one scene is selected as the distance representing the scene. After the distances for all scenes has been calculated, candidates are selected in ascending order of distance.

d) Generation of Image Storage Address (Step 94 of FIG. 9):

By means of the comparative table, or the like, the number of the starting frame of a candidate is converted in to a storage address for the frame image in the motion image database 22.

e) Display of a Candidate Scene (Step 95):

The storage address obtained in step 94 is accessed in ascending order of the distance calculated in step 93 and image data on the starting frame are transferred to and shown, on a display unit (not illustrated). The user sees the starting frame (still image) and determines whether it is the scene he/she desires. When he/she wants to see its motion image, subsequent frames are reproduced in sequence.

3. Modifications

The invention was been described above with reference to a preferred embodiment; however, the availability of the invention is not limited to this embodiment.

For example, the device for inputting a movement is not limited to a mouse. Any device that permits a user to express a motion by changing its spatial position may be used, such as a data glove.

In retrieval of a scene, conventional key word retrieval methods may additionally be used. In this case, the user may specify not only the characters or numerical values given to the scene but also the name, color, shape or other attributes of a moving object to be retrieved. The color of the object may, of course, be selected from a color menu instead of specifying it in words, further, the shape of the object may be specified by drawing its contour with a mouse or the like instead of expressing it in words.

For efficiency of retrieval, the described embodiment discards a representative motion vector sequence, and registers, in the motion information database, only motion indices obtained by roughly sampling the vector sequence. Depending on the application used, however, matching at the level of a representative motion vector sequence may be required. In this case, representative motion vector sequences and motion indices are registered in the motion information database beforehand, so as to first perform rough matching at the level of motion indices and to execute matching only for motions matched successfully at the level of representative motion vector sequences, and thereby to determine candidates. It is of course possible, without generating motion indices, to register only representative motion vector sequences in the motion information database and to execute matching only at the level of representative motion vector sequences. In general, however, the procedure employed by the preferred embodiment is advantageous ill term of the retrieval cost.

Further, the preferred embodiment registers time series vectors representing the motion of an object. However, a time series of coordinates of the position of the object may be registered instead of the time series vectors. In this case, if retrieval conditions are input as a time series of coordinates, matching can be performed on the basis of the distance defined by equation (5), since the four terms enclosed by parentheses in equation (5) represent coordinates in xy space. However, in order to cope flexibly with ambiguous query conditions, it is advantageous to store motion information in the form or a time series of vectors, as in the preferred embodiment.

Further, in the example explained with reference to FIGS. 19 and 20, an index is prepared by dividing a screen into equal-sized blocks R1 to R4; however, it is also possible to make an index by dividing a screen into variable-sized blocks in accordance with the distribution of the stored data in reliance on the known technique such as kd-tree.

As described above, the invention provides an environment for retrieving portions of a motion image, permitting a user to input a motion, which is ambiguous information, almost as he/she visualizes by changing the spatial position of a device. The invention also provides a method for automatically extracting information on the motion of an object appearing on a screen and for storing extracted information in a motion information database, which is essential for such retrieval, and a method for matching an input condition with the motion information database, thereby enabling user-friendly, efficient retrieval in which notion is used as a query condition.

Having thus described our invention what we claim as new and desire to secure as Letters Patent, is:

1. A system for storing motion pictures comprising scenes in which at least one object moves and for selectively retrieving scenes in which an object moves in accordance with a query defining a movement, comprising:

(a) means for storing motion pictures subdivided into scenes, each scene comprising a sequence of image frames;

(b) means for storing one or more motion specifications in association with each stored scene in which at least one object moves, each motion specification for a particular scene defining an interframe path that an object takes in the stored particular scene;

(c) a pointing device for inputting a query motion by tracing a path with the pointing device as a function of time;

(d) means for automatically generating a query motion specification in response to the inputted query motion; and (e) means for comparing a query motion specification with the stored motion specifications.

2. The system according to claim 1 including means for interactively modifying the generated query motion specification.

3. The system according to claim 1 including means for accessing and displaying in response to said means for comparing a stored scene having a stored associated motion specification that matches the query motion specification.

4. A system for selectively retrieving, from a stored motion picture subdivided into scenes, in which each scene comprises a sequence of image frames, and in which at least some of the scenes depict at least one moving object, a desired scene in which an object moves in accordance with a query defining a movement, comprising:

(a) means for storing at least one motion specification in association with each stored scene, each motion specification for a particular scene defining an interframe path that an object takes in said stored particular scene;

(b) a pointing device for inputting a query motion by tracing a path with the pointing device as a function of time;

(c) means for automatically generating a query motion specification in response to the inputted query motion; and (d) means for comparing a query motion specification with the stored motion specifications.

5. The system according to claim 4 wherein a motion specification comprises: a starting time of an interframe path, a duration of an interframe path, coordinates of a starting point of an interframe path, and a series of path vectors each representing a portion of an interframe path.

6. The system according to claim 5 including a file that describes a sequential relationship of starting points in time of a plurality of stored motion specifications associated with scene, and means responsive to a plurality of query motion specifications for accessing said file and retrieving a plurality of motion specifications whose starting points in time have the same sequential relationship as that of said query motion specifications.

7. The system according to claim 5 including a file that describes the position of each starting point of a stored motion specification by identifying one of a plurality of regions created by partitioning a display screen, and means responsive to a query motion specification identifying a particular region for accessing said file and retrieving motion specifications whose starting points are identified as being in said particular identified region.

8. The system according to claim 4 wherein said means for comparing selects a matching procedure in response to a user's specification of a degree of closeness required between a query motion specification and a stored motion specification in order to be considered to match.

9. A method for retrieving a desired motion picture scene stored in a motion picture processing system that includes means for storing motion specifications defining motions of objects appearing in stored motion picture scenes, and a device for inputting a desired query motion by tracing a path with said device as a function of time, wherein said method comprises the steps of:

(a) generating a query motion specification in response to a change in position of said device;

(b) comparing the generated query motion specification with stored motion specifications to identify matching specifications; and (c) accessing and displaying stored motion picture scenes associated with stored motion specifications that have been determined in step (b) to match the query motion specification.

10. An input system for inputting a query motion as a query condition for retrieving a desired portion of a stored motion picture, comprising:

(a) a device for inputting motion data defining a query motion;

(b) means for displaying a scroll bar having a length and an end position and representing the query motion, with the end position of the scroll bar indicating a starting time of said query motion and the length of the scroll bar indicating a duration of said query motion, (c) means for modifying the end position and length of said scroll bar; and (d) means, responsive to modification of the end position or length of said scroll bar, for modifying motion data corresponding to said scroll bar.

11. The system according to claim 10 further including means for reproducing the query motion.

* * * * *